Patented Sept. 10, 1946

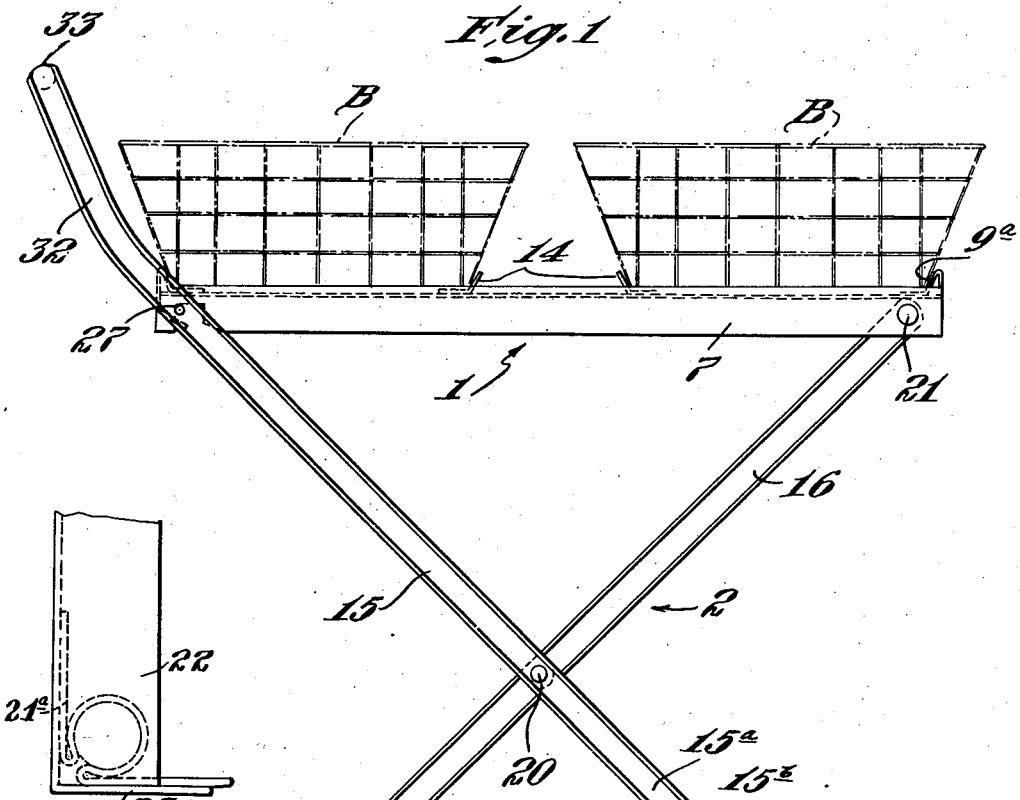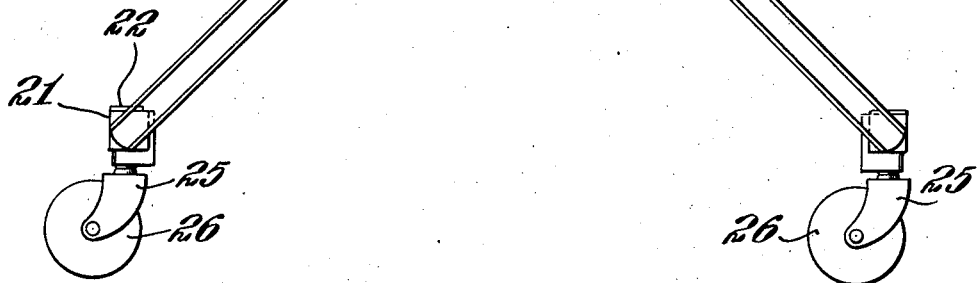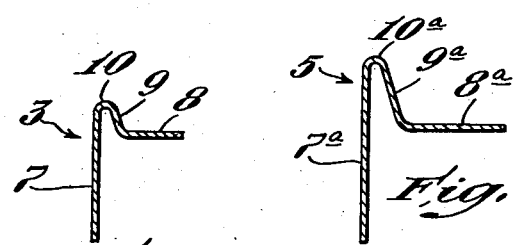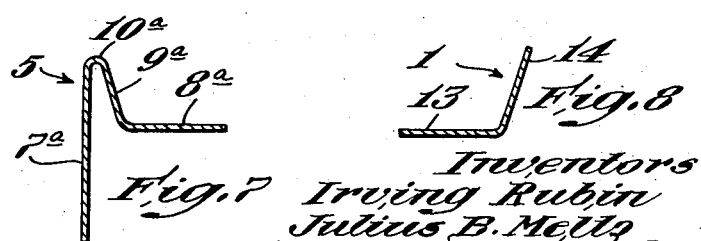

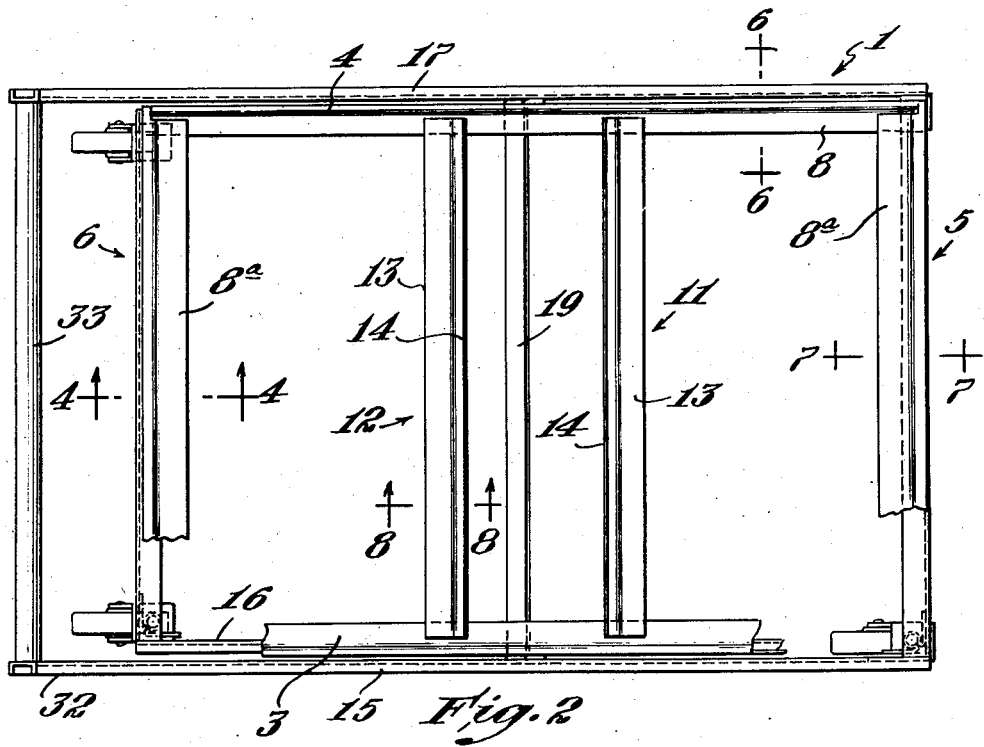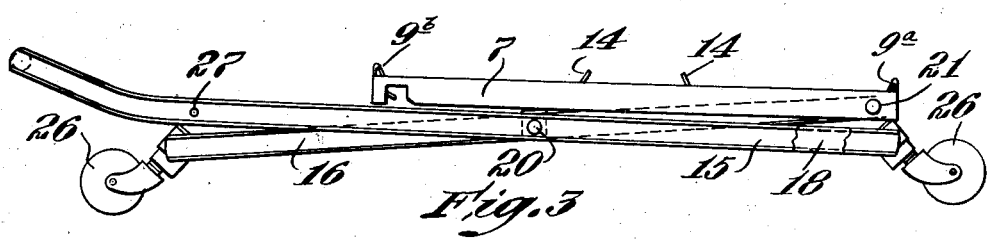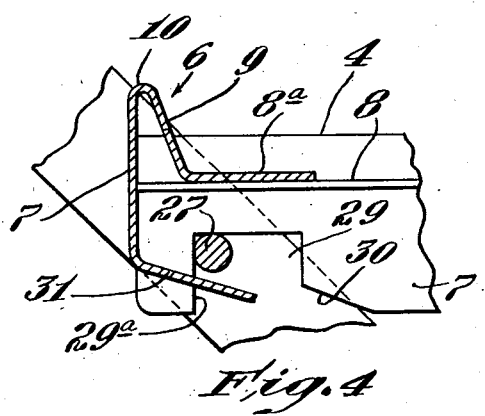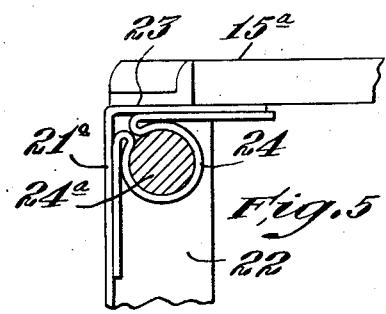
Inventors
Irving Rubin
Julius B. Meltz

2,407,385

UNITED STATES PATENT OFFICE 2,407,385

COLLAPSIBLE WHEELED TRAY

Irving Rubin, Brookline, and Julius B. Meltz, Everett, Mass.

Application November 28, 1944, Serial No. 565,460

13 Claims. (Cl. 280—41)

This invention pertains to portable supports, more especially to a collapsible wheeled tray useful, for specific example, for transporting baskets of merchandize in a self-service store, although of more general utility to facilitate the movement of loads from place to place.

The wheeled trays or carriages customarily employed in self-service stores have provision for supporting two baskets, one above the other, but in the usual construction the lower basket is not positioned conveniently for the customer, and it is very difficult, if not impossible, for the cashier without assistance to remove the loaded lower basket and raise it to the counter level.

One object of the present invention is to provide a wheeled tray arranged to support two or more baskets substantially at the counter level so that both baskets are conveniently located for the customer, and so that both are readily removable without assistance by the cashier. A further object is to provide a tray of this general type so devised that the removal of both baskets by the cashier is facilitated, while at the same time the tray is so devised that it does not occupy substantially more floor space than the usual two story tray.

Wheeled trays of this type necessarily occupy considerable floor space when in use, and a further object of the present invention is to provide such a tray so constructed that it may readily be collapsed when it is not in use so as to occupy a comparatively small space for convenience in storage or in shipment. A further object is to provide a tray of this general type which when collapsed may still be moved freely on its supporting wheels and which in this condition constitutes a convenient low, level truck on which material may be piled for easy transportation. A further object is to provide a collapsible tray of this type which when in use is rigid and strong and safe from accidental collapse, although readily foldable when desired and without necessitating the use of tools, or the loosening of bolts and the like when collapsing it or in restoring it to operative condition. A further object is to provide a device of this kind having the above characteristics which may be made cheaply and with a minimum amount of material. Other and further objects and advantages of the invention will be pointed out in the following more detailed description and by reference to the accompanying drawings wherein:

Fig. 1 is a side elevation of the tray with its load-supporting platform in normal elevated position, a pair of baskets being indicated in broken lines as mounted on the platform;

Fig. 2 is a plan view of the tray shown in Fig. 1 with certain parts broken away;

Fig. 3 is a side elevation of the tray in its collapsed position with certain parts broken away;

Fig. 4 is a fragmentary, vertical section substantially on the line 4—4 of Fig. 2 but to a larger scale;

Fig. 5 is a fragmentary bottom plan view of a lower end of one of the legs and the socket for the swivel of one of the caster wheels;

Fig. 6 is a section to a larger scale on the lines 6—6 of Fig. 2;

Fig. 7 is a similar section on the lines 7—7 of Fig. 2;

Fig. 8 is a section on the lines 8—8 of Fig. 2; and

Fig. 9 is a fragmentary plan view showing the end portion of one of the transverse bottom rails.

Referring to the drawings, the numeral 1 designates the platform or article supporting member of the device and the numeral 2 indicates the collapsible support for the platform. The platform comprises spaced, parallel side rails 3 and 4 and spaced parallel end rails 5 and 6, the rail 5 being hereinafter designated, for convenience, the front rail and the rail 6 being termed the rear rail but without any implication that one or the other end of the device is necessarily the front end. Each of the side rails (Fig. 6) is made of a length of sheet metal bent to provide a vertical flange 7, a horizontal flange 8, an upwardly sloping apron portion 9 and a smoothly rounded bead or top edge 10. Each of the end rails 5 and 6 is in general similar to the side rail, comprising a vertical flange 7a, the horizontal flange 8a, a sloping apron portion 9a, and a rounded edge bead 10a. However, the height of the bead or edge 10a above the level of the upper surface of the flange 8a is greater than the height of the edge 10 above the upper surface of the flange 8. The side and end rails are assembled with portions of the horizontal flanges of the end rails lapping portions of the horizontal flanges of the side rails and these flanges are permanently and rigidly united, for example, by arc welding to form a rectangular frame.

The platform also comprises a pair of spaced, parallel guide members 11 and 12 of substantially like construction, each consisting of a strip of sheet metal, bent as shown in Fig. 8, to form a horizontal flange 13 and an upwardly sloping apron portion 14. These guide members are assembled with the rectangular frame previously described with the ends of the horizontal flanges 13 of the guide members lapping the horizontal flanges of the side rails and with the sloping aprons 14 of the two guide members 11 and 12 diverging upwardly, the guide members being rigidly united to the side rails by welding, rivets or the like. As thus constructed, the platform defines two transversely extending parallel, shallow channels for the reception of removable article containers such, for example, as the metal baskets B shown in Fig. 1. The floors of these channels are constituted by the horizontal flanges of the guide members 11 and 12 respectively, and the horizontal flanges 8ª of the end rails, while the side walls of these channels are constituted by the sloping apron members 14 of the guide members and the sloping aprons 8ª of the end rails. The sloping aprons 9 of the side rails, as above pointed out, do not reach up as high as the aprons 9ª of the end rails and the aprons 14 of the guide members, and form stops for the ends of the channels to prevent accidental slipping of the baskets from out of the channels. However, the sloping aprons 9 facilitate the removal of the baskets by pulling them endwise from out of the channels when it is desired to do so.

The platform above described, with its container-receiving channels, is normally supported at a level above the floor such that its article-supporting surface is substantially flush with the counter of the store in which the device is to be used, assuming that the device is to be employed in a self-service store.

Obviously, for other uses, the height of the platform may be arranged appropriately for the particular use to which the device is to be put.

The support for the platform comprises two pairs of legs, to wit, the legs 15 and 16 (being referred to for convenience as the right-end pair) and the legs 17 and 18 (being referred to for convenience as the left-end pair). Each of these legs, as indicated in Fig. 1, preferably consists of a strip of channel stock, for example, rolled steel, having the flat web member 15ª and the parallel flanges 15ᵇ. As illustrated, the flanges of these channel members are directed outwardly, and the legs 16 and 18 are disposed at the inner sides of the legs 15 and 17 respectively. The legs 16 and 18 are preferably rigidly united by a member 19 bent to provide downwardly turned tabs at its opposite ends which lap over the outer surfaces of the legs 16 and 18 and which may be united to said legs by riveting or welding if desired. The outer legs 15 and 17 are pivotally connected to the inner legs 16 and 18 respectively, by pivot members 20. Preferably, these pivot members pass through the bent-over end portions of the connecting member 19. The legs 15 and 16, and 17 and 18 of the respective pairs may thus be swung about the axes of the pivots 20 from the position shown in Fig. 1 to that shown in Fig. 3.

The upper ends of the legs 16 and 18 are connected by pivots 21 with the vertical flanges 7 of the side rails 3 and 4 respectively. The lower ends of the legs 16 and 18 and the lower ends of the legs 15 and 17 are connected respectively by means of transversely rigid angle bars comprising the vertical flanges 21ª and the horizontal flanges 22, these bars being provided with right angular bends at their ends to provide tabs 23 Fig. 5 which are rigidly united, as by welding, to the web members 15ª of the corresponding legs.

Within the right angular bend of each of these bottom rails there is fixed a socket member 24, here illustrated as formed by bending a piece of metal and welding it to the bottom rail, these socket members being designed to receive the swivel spindles 24ª of casters 25 having wheels 26. These casters may swivel freely within the sockets 24.

The upper ends of the legs 15 and 17 are united by a bar or rod 27, (Figs. 1 and 4) rigidly secured at its opposite ends to the respective legs, and which is normally substantially in the same horizontal plane as the axes of the pivots 21. The vertical flange 7 of each of the side rails 3 and 4 is provided near its rear end with an upwardly directed notch 29 having a substantially vertical wall 29ª and preferably having an inclined forward wall portion 30. The notches 29 are designed to receive the opposite end portions of the bar or rod 27 respectively, the bar or rod bearing against the rear walls 29ª of the notches and thus holding the support 2 in the operative position illustrated in Fig. 1 wherein the platform is in the normal elevated operative position. The sloping surface 30 at the forward edge of the notch assists in guiding the bar or rod 27 upwardly into the notch when placing the device in its operative position. In order to prevent accidental disengagement of the bar or rod 27 from the notch 29 while the device is in use, it is preferred to provide detent means such, for example, as the forwardly and downwardly sloping rigid flange member 31, forming an extension of the vertical flange 7 of the rear rail 6 of the platform. The forward free edge of the flange 31 lies beneath the bar or rod when the parts are properly assembled so that direct upward lift of the rear end of the platform cannot disengage the rail 27 from the abutment surface 29ª. In order to disengage the bar or rod 27 from the notch 29, it is necessary to pull the rail 6 rearwardly at the same time lifting it slightly so that the bar or rod 27 may be permitted to pass out from the notch 29 at a point forward of the free edge of the detent member 31.

Preferably for convenience in moving the device about, the legs 15 and 17 are provided with upwardly directed curved extensions 32 which are connected at their upper ends by a cross bar 33, preferably circular in transverse section, which is rigidly united at its opposite ends to the parts 32. If desired, this bar 33 may be covered with any appropriate material to provide an acceptable and pleasant surface to be gripped by the hands of the user.

Normally, the device is arranged as shown in Fig. 1 with the platform at a substantial elevation from the floor, and in this position it may be freely wheeled about by the customer while selecting the merchandise to be placed in the baskets. In this arrangement, since both baskets are at the same level and both conveniently positioned, the user is not required to stoop in placing goods in the baskets, and the goods thus placed in the containers are at all times clearly visible. When the device is wheeled up to the cashier's desk, the cashier may readily pull each basket from off the platform merely by slightly raising the end of the basket which is nearest him and pulling it endwise from out of its channel. On the other hand, during the filling of the basket, the stop members 9 effectively prevent accidental slipping of the basket from off the platform.

If it be desired to collapse the device, for example, to store it when not in use, it is only necessary to pull the rear rail 6 upwardly and rearwardly so as to disengage the bar or rod 27 from the notches 29, and then to permit the handle 33 to move downwardly until the parts assume the position shown in Fig. 3. In this position the spindles of the wheels 26 assume an inclined position, but the wheels are still free to turn so that the device may readily be rolled along the floor. In this position also, the platform still remains nearly horizontal and thus the device forms an effective truck upon which articles may be put for moving them about. In this collapsed position, the device occupies very little space, and a substantial number of them may be piled one on the other, the lower one then constituting a truck to facilitate their transportation.

While the arrangement is such that both baskets are located at the same level, the device occupies but little more floor space than the usual portable tray or carriage employed in self-service stores, and the arrangement of the two baskets at the same level is of great convenience both to the customer and to the cashier.

The device is constructed, as above described, of satisfactory metal or standard similar parts or rods and may thus be made very shapely, while at the same time it is very rigid and strong due in part at least to the special shape given to the side and end rails and to the arrangement of the guide members 11 and 12 intermediate the ends of the rectangular frame. The device is very stable, since the wheels are spread a substantial distance apart so that there is little danger that it will tip when rolled, and the structure is so rigid that it will withstand abusive usage for a long period without losing its shape or breaking down.

While one desirable embodiment of the invention has herein been illustrated, it is to be understood that the invention is not merely limited to this prior embodiment but is to be regarded as broadly inclusive of any and all modifications falling within the scope of the appended claims.

We claim:

1. A portable tray of the class described, comprising a rigid substantially rectangular platform designed to receive articles to be supported, a support for the platform comprising two pairs of crossed legs, corresponding legs of the two pairs being rigidly connected near their lower ends, a wheel arranged adjacent to the lower end of each leg, pivot means uniting the upper end of one leg of each of the two pairs to the platform near one end of the latter, and a transversely extending rod having its opposite ends rigidly and permanently united to the upper ends respectively of the other legs, the opposite end of the platform having notches designed to receive the rod thereby to hold the platform in its normal elevated position, and detent means operative to prevent accidental disengagement of the rod from said notches.

2. A portable tray of the class described, comprising a rigid platform, and a support therefor comprising two pairs of crossed legs, means rigidly uniting corresponding legs of the two pairs adjacent to the crossing points, pivot means uniting the legs of each pair at the crossing point, rigid bottom rails uniting corresponding legs of the two pairs near their lower ends, each of said bottom rails having a right angular bend at each end, thereby providing a tab located substantially in a plane parallel to that of the leg to which said end of the bottom rail is attached, a socket member disposed within each of said right angular bends and rigidly united to the corresponding tab and to the body portion of the rail, and caster wheels each having a spindle which swivels in one of the respective sockets.

3. A portable support of the class described comprising a normally elevated platform including substantially parallel side rails each having a vertical flange merging at its upper edge with a smoothly rounded bead and each having a horizontal flange disposed in a plane below the rounded bead, end rails each also comprising a vertical flange, a bead and a horizontal flange, means permanently and rigidly uniting the horizontal flanges of the end rails to the horizontal flanges of the side rails so as to form a substantially rectangular frame, and means cooperating with the respective end rails to define channels for the reception of removable containers.

4. A portable support of the class described comprising a normally elevated platform including substantially parallel side rails each having a vertical flange merging at its upper edge with a smoothly rounded bead, each bead merging at its inner edge with a downwardly and inwardly sloping apron, and a horizontal flange integral with the lower edge of said apron, end rails each having portions corresponding to the aforesaid parts of the side rails, the horizontal flange of each end rail lapping the horizontal flanges of the respective side rails, means permanently uniting said flanges to form a rectangular frame, and means intermediate the ends of said frame cooperable with the respective end rails to define parallel transversely extending channels for the reception of removable containers.

5. A portable support of the class described comprising a normally elevated, substantially rectangular platform including spaced parallel side rails and spaced parallel end rails, each of said rails consisting of a length of sheet metal and each rail including a vertical outer flange, a horizontal inner flange, and an upwardly and outwardly sloping apron united at its lower, inner edge to the horizontal flange and at its upper outer edge by a rounded bead to the upper edge of the vertical flange, the horizontal flanges of the end rails being permanently and fixedly united to the horizontal flanges of the side rails, a pair of parallel guide members each having a horizontal flange and an upwardly sloping apron portion, means permanently uniting the horizontal flanges of the guide members to the horizontal flanges of the respective side rails, the aprons of the guide members and of the end rails defining the sides of parallel channels and the horizontal flanges of said guide members and of the guide rails forming portions of the floors of said channels, the apron portions of the side rails being of less height than those of the end rails and guide members and constituting stops for the ends of the channels.

6. A portable support of the class described having a normally elevated platform which comprises spaced parallel side rails and parallel end rails fixedly united at their opposite ends to the respective side rails, the side and end rails all having inwardly-directed substantially horizontal flanges, and spaced parallel transversely extending guide members whose opposite ends are rigidly secured to the respective side rails, the guide members having horizontal flanges in substantially the same plane as the horizontal flanges of the end rails and, with the latter flanges, constituting supports for baskets, the end rails and said guide members each having an upwardly-directed element which elements collectively define the sides of parallel channels for the reception of baskets, each side rail having an upwardly-directed rib of lesser height than the channel-forming elements, said ribs constituting stops at the ends of the respective channels.

7. A portable tray as set forth in claim 1 and wherein the platform is provided with means defining two parallel transversely extending channels for the reception of removable article containers, and a stop element at each end of each of said channels operative to prevent accidental escape of the containers, said stop elements sloping upwardly and outwardly to facilitate withdrawal of the removable containers endwise from said channels.

8. A portable tray of the class described comprising a rigid platform and a wheeled support normally operative to hold the platform in substantially horizontal position and at substantially the height of a store counter, said platform having a plurality of transversely extending channels each designed to receive a basket for merchandise, each channel having upwardly sloping side and end walls, the end walls being lower than the side walls to facilitate withdrawal of the baskets from their respective channels by sliding them endwise out of the channels, the support for the platform comprising two pairs of crossed legs, corresponding legs of the two pairs being rigidly connected near their lower ends, a wheel arranged adjacent to the lower end of each leg, pivot means uniting the upper end of one leg of each of the two pairs to the platform near one end of the latter, and means operative detachably to unite the upper ends of the other legs to the other end of the platform.

9. A portable support substantially as set forth in claim 3 and wherein the channel-defining means comprises a pair of horizontal flanges disposed in substantially the same plane as the horizontal flanges of the end rails and which cooperate with the latter flanges to constitute supports for containers.

10. A portable support substantially as set forth in claim 3 and wherein the means which cooperates with the end rails to define the container-receiving channels comprises parts which cooperate with the horizontal flanges of the respective end rails to form portions of the floors of the respective channels, said parts having associated therewith upwardly directed elements which cooperate with portions of the adjacent end rails respectively to define the opposite side walls of parallel transversely extending channels.

11. A device of the class described substantially as set forth in claim 3 and having a support for the platform operative normally to hold the platform at substantially the height of a store counter, said support comprising two pairs of crossed legs, corresponding legs of the two pairs being rigidly connected near their lower ends, a wheel arranged adjacent to the lower end of each leg, and connecting means permanently uniting the platform to the support, said connecting means defining a horizontal pivotal axis adjacent to one end of the platform about which the platform may swing, the support having a transversely extending member which constitutes a rest for the opposite end portion of the platform thereby normally to hold the platform in substantially horizontal position, and releasable retaining means normally operative to prevent said latter end of the platform from lifting accidentally from the rest.

12. A portable support substantially as set forth in claim 4 wherein the means which cooperates with the end rails to define the container-receiving channels comprises supporting elements disposed substantially in the plane of the horizontal flanges of the end rails and an upwardly directed part associated with each of said supporting elements, means permanently uniting the supporting elements to the horizontal flanges of the side rails, each of said upwardly directed parts cooperating with the apron of the adjacent end rail respectively to define the opposite side walls respectively of parallel transversely extending channels, and said supporting elements cooperating with the horizontal flanges of the respective side rails to define portions of the floors of said channels, the apron portions of the side rails constituting stops for the ends of the channels.

13. A portable tray of the class described comprising a rigid platform for articles to be supported, the platform being provided with means defining two parallel, transversely extending channels for the reception of removable article containers, and a stop element at each end of each of said channels operative to prevent accidental escape of the containers from the channels, a support for the platform operative normally to hold the platform at substantially the height of a store counter, said support comprising two pairs of crossed legs, corresponding legs of the two pairs being rigidly connected near their lower ends, a wheel arranged adjacent to the lower end of each leg, connecting means permanently uniting the platform to the support, said connecting means defining a horizontal pivotal axis adjacent to one end of the platform about which the platform may swing, the support having a transversely extending rigid member which constitutes a rest for the opposite end portion of the platform thereby to hold the platform in a normally substantially horizontal position, and releasable retaining means normally operative to prevent said latter end of the platform from lifting accidentally from the rest.

IRVING RUBIN.
JULIUS B. MELTZ.